US008502491B2

United States Patent
Horng et al.

(10) Patent No.: US 8,502,491 B2
(45) Date of Patent: Aug. 6, 2013

(54) ROTATION DIRECTION CONTROL METHOD FOR A COOLING FAN AND ROTATION DIRECTION CONTROL CIRCUIT THEREOF

(75) Inventors: Alex Horng, Kaohsiung (TW); Ching-Sheng Hung, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 257 days.

(21) Appl. No.: 12/965,306

(22) Filed: Dec. 10, 2010

(65) Prior Publication Data

US 2012/0086379 A1 Apr. 12, 2012

(30) Foreign Application Priority Data

Oct. 6, 2010 (TW) .............................. 99134044 A

(51) Int. Cl.
  *G05D 23/00* (2006.01)
(52) U.S. Cl.
  USPC ........ 318/641; 318/400.08; 318/16; 318/257; 318/602; 318/806; 310/156.12; 310/156.14; 310/156.29; 310/90; 310/91; 361/25; 361/103; 361/695; 361/649.55; 361/676
(58) Field of Classification Search
  USPC ................... 318/16, 257, 280, 260, 269, 268, 318/287, 254.1, 283, 562, 602, 812, 806, 318/753, 652, 594, 472; 361/25, 103, 695, 361/688, 690, 679.49, 679.55, 679.56, 93.4, 361/93.9, 692, 697, 679.06, 679.05, 649.48, 361/676; 310/156.12, 156.14, 156.29, 90, 310/99.08, 91
  See application file for complete search history.

(56) References Cited

U.S. PATENT DOCUMENTS

| | | | |
|---|---|---|---|
| 3,614,388 A * | 10/1971 | Robinson | 219/400 |
| 4,418,298 A | 11/1983 | Suzuki et al. | |
| 6,076,488 A * | 6/2000 | Yamagishi | 123/41.12 |
| 6,211,632 B1 | 4/2001 | Liao | |
| 6,519,937 B2 | 2/2003 | Nanri et al. | |
| 6,750,623 B1 * | 6/2004 | McCauley et al. | 318/260 |
| 7,008,184 B2 * | 3/2006 | Bettencourt et al. | 416/1 |
| 2003/0183433 A1 * | 10/2003 | MacKelvie | 180/68.1 |
| 2010/0010676 A1 * | 1/2010 | Lee et al. | 700/275 |
| 2011/0060471 A1 * | 3/2011 | Aggus et al. | 700/282 |
| 2012/0026677 A1 * | 2/2012 | Bhutani et al. | 361/679.48 |

FOREIGN PATENT DOCUMENTS

TW 1308678 4/2009

* cited by examiner

*Primary Examiner* — Eduardo Colon Santana
*Assistant Examiner* — Jorge Carrasquillo
(74) *Attorney, Agent, or Firm* — Muncy, Geissler, Olds & Lowe, PLLC

(57) ABSTRACT

A rotation direction control method of a cooling fan is disclosed. The rotation direction control method includes a detection step, a determination step and a driving step. The detection step receives a temperature control signal from a temperature detection unit by a rotation direction control unit when a predetermined dust-expelling time period begins. The determination step determines whether a detected temperature is higher than a predetermined value based on the temperature control signal by the rotation direction control unit. The driving step controls the rotation direction control unit to keep outputting a cooling signal so as to drive a motor of the cooling fan for a cooling operation when the determination of the determination step is positive.

10 Claims, 6 Drawing Sheets

ROTATION DIRECTION CONTROL METHOD FOR A COOLING FAN AND ROTATION DIRECTION CONTROL CIRCUIT THEREOF

BACKGROUND OF THE INVENTION

1. Field of the Invention

The invention generally relates to a rotation direction control method for a cooling fan and a rotation direction control circuit thereof; more particularly, to a rotation direction control method, that adjusts output rotation commands thereof based on a detected temperature, and a rotation direction control circuit thereof.

2. Description of the Related Art

Cooling fans are often installed in electronic devices for heat dissipation. During the operation of a cooling fan, the cooling fan rotates in a cooling direction (either clockwise or counterclockwise) to draw the external cool air into the electronic devices to have heat exchange with a heat source inside the electronic devices. However, the dust contained in the air may remain inside the electronic devices during the heat exchange. To clean the dust, at the moment the electronic devices are powered-on, the cooling fan usually rotates in a dust-expelling direction (either clockwise or counterclockwise) opposite to the cooling direction for a time period (such as 5 sec) in order to exhaust the accumulated dust from the electronic devices. After the dust exhaustion is finished, the cooling fan rotates in the cooling direction for heat dissipation of the electronic devices.

FIG. 1 shows a conventional rotation direction control circuit 9 that controls forward and reversed rotations of a fan for dust exhaustion and heat dissipation, respectively. The rotation direction control circuit 9 comprises a driving unit 91 and a rotation direction control unit 92, both connected to a power supply VCC. The driving unit 91 is electrically connected to the rotation direction control unit 92. In addition, the driving unit 91 is electrically connected to a motor 8.

With the rotation direction control circuit 9, the rotation direction control unit 92 sends a first rotation control signal to the driving unit 91 during a cooling operation so that the driving unit 91 controls the motor 8 to rotate in the cooling direction for heat exchange. On the contrary, the rotation direction control unit 92 sends a second rotation control signal to the driving unit 91 during a dust-expelling operation so that the driving unit 91 controls the motor 8 to rotate in the dust dispelling direction for dust exhaustion.

However, the conventional rotation direction control circuit 9 generally has some drawbacks. For example, the rotation direction control unit 92 switches between the first and second rotation control signals only at a specific moment. Specifically, at the moment the cooling fan starts, the cooling fan can temporarily rotate in the dust dispelling direction to clean the dust before or after it rotates in the cooling direction for heat exchange. In this operation mechanism, the rotation direction control unit 92 might switch to output the second rotation control signal at an improper moment. In other words, the rotation direction control unit 92 may switch from the first rotation control signal to the second rotation control signal when the scheduled cooling period expires at a moment when heat dissipation still needs to be carried on. Thus, the motor 8 no longer operates to cool down the electronic devices, causing the electronic devices to be more likely damaged.

Furthermore, Taiwanese Patent Number I308678 discloses another conventional rotation direction control method which, when a computer calls for parameters of an interrupt interface of a Basic Input/Output System (BIOS) upon receipt of a command instructing the computer to perform a shutdown operation, detects a temperature of an electronic device in the computer and determines whether the detected temperature is higher than a predetermined temperature. If the detected temperature is higher than the predetermined temperature, a cooling fan is driven to rotate in an opposite direction for dust exhaustion. However, the cooling fan rotates in the opposite direction for dust exhaustion rather than heat dissipation. Therefore, if the conventional rotation direction control method is applied to the computer; which is being operated under a normal operation rather than the shutdown operation where only the parameters of the interrupt interface are called, damages to the electronic device could result as the cooling fan is switched over to rotate in the opposite direction for dust exhaustion when the cooling operation of the electronic device is still highly needed.

In light of the problem, it is desired to improve the conventional rotation direction control method and the conventional rotation direction control circuit 9.

SUMMARY OF THE INVENTION

The primary objective of this invention is to provide a rotation direction control method of a cooling fan, as well as a rotation direction control circuit thereof'. The invention allows the cooling operation to be carried on in a predetermined dust-expelling time period when a detected temperature of an electronic device is too high, preventing damages to the electronic device resulting from the high operation temperature as the cooling fan switches to rotate in an opposite direction for dust exhaustion.

The invention discloses a rotation direction control method of a cooling fan. The rotation direction control method includes a detection step, a determination step and a driving step. The detection step receives a temperature control signal from a temperature detection unit by a rotation direction control unit when a predetermined dust-expelling time period begins. The determination step determines whether a detected temperature is higher than a predetermined value based on the temperature control signal by the rotation direction control unit. The driving step controls the rotation direction control unit to keep outputting a cooling signal so as to drive a motor of the cooling fan for a cooling operation when the determination of the determination step is positive.

Furthermore, the invention discloses a rotation direction control circuit of a cooling fan. The rotation direction control circuit includes a driving unit electrically coupled to a motor of the cooling fan, a temperature detection unit generating a temperature control signal according to a detected temperature thereof; and a rotation direction control unit electrically coupled to the driving unit and the temperature detection unit. The rotation direction control unit receives the temperature control signal of the temperature detection unit, and outputs a cooling signal to the driving unit for a cooling operation or outputs a dust-expelling signal to the driving unit for a dust exhaustion operation. The rotation direction control unit outputs the cooling signal when the detected temperature is higher than a predetermined value.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
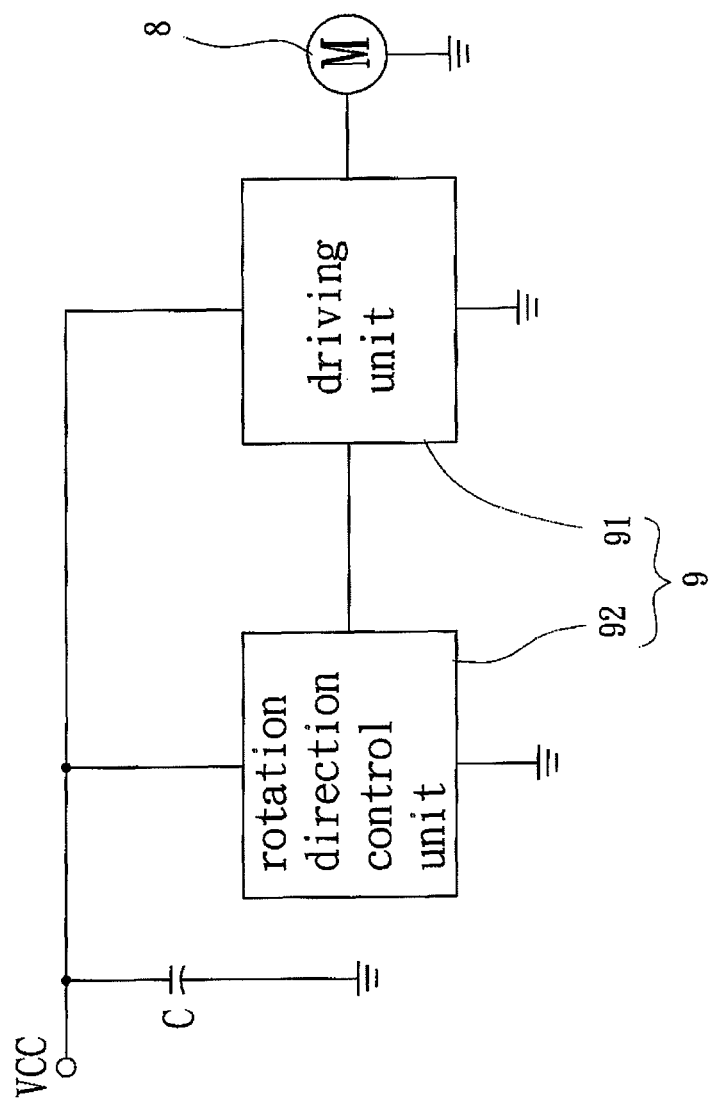
FIG. 1 shows a circuit diagram of a conventional rotation direction control circuit.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings and are utilized only to facilitate describing the invention.

DETAILED DESCRIPTION OF THE INVENTION

Figure 2:
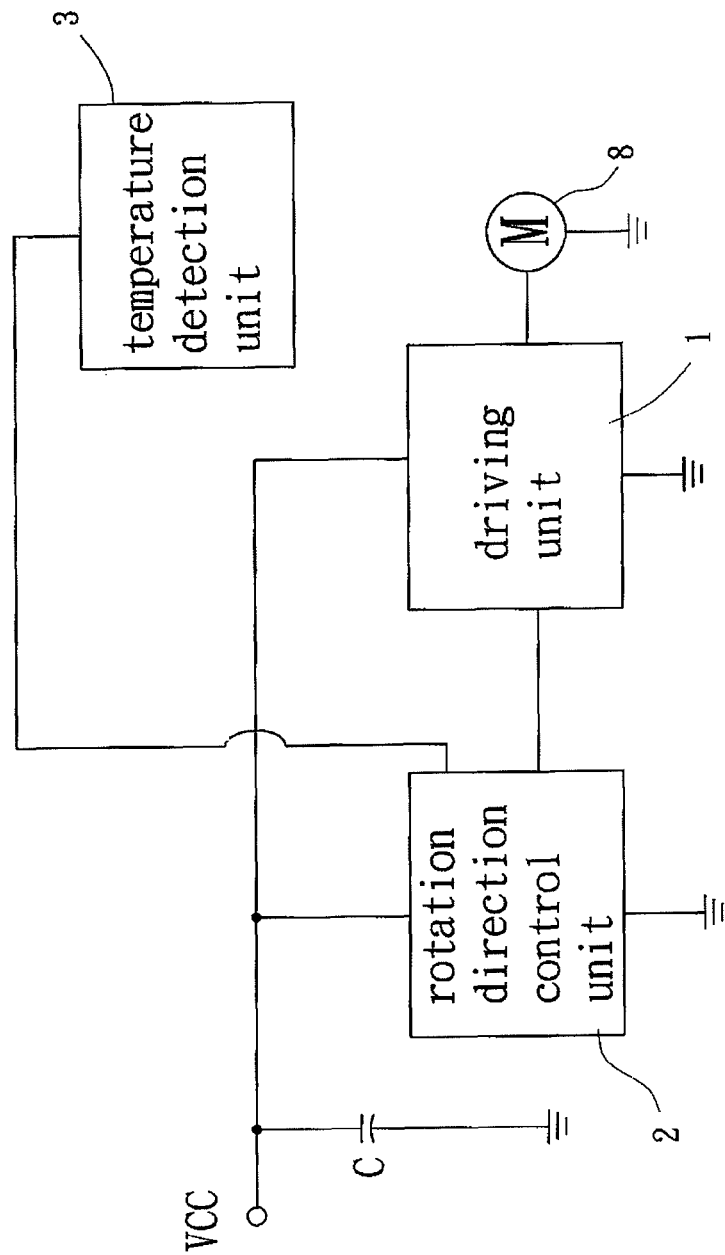
FIG. 2 shows a circuit diagram of a rotation direction control circuit according to a preferred embodiment of the invention.

Referring to FIG. 2, a circuit diagram of a rotation direction control circuit is disclosed according to a preferred embodiment of the invention. The rotation direction control circuit includes a driving unit 1, a rotation direction control unit 2 and a temperature detection unit 3. The driving unit 1 is coupled to the rotation direction control unit 2 and a motor 8. The temperature detection unit 3 is electrically connected to the rotation direction control unit 2. Specifically, the rotation direction control unit 2 may be implemented by a microcontroller or an electronic circuit which generates and sends a cooling signal to the driving unit 1 which, in turn, controls the motor 8 to rotate in a first direction (such as a clockwise direction) for cooling purposes. On the contrary, the rotation direction control unit 2 may generate and send a dust-expelling signal to the driving unit 1 which, in turn, controls the motor 8 to rotate in a second direction (such as a counterclockwise direction) for dust exhaustion. The rotation direction control unit 2 sets a predetermined cooling time period and a predetermined dust-expelling time period. The predetermined cooling time period and predetermined dust-expelling time period can be arranged in an interlaced manner to drive the motor 8 for dust exhaustion during the predetermined dust-expelling time period, and to drive the motor 8 for cooling purposes during the predetermined cooling time period. In addition, both the cooling and dust-expelling signals may be a low-level or high-level signal different from each other. For instance, the cooling signal may be the low-level signal and the dust-expelling signal may be the high-level signal, or the cooling signal may be the high-level signal and the dust-expelling signal may be the low-level signal. The temperature detection unit 3 generates a temperature control signal based on a detected temperature thereof; and sends the temperature control signal to the rotation direction control unit 2. Thus, the rotation direction control unit 2 is able to determine whether to change between the cooling signal and the dust-expelling signal for output.

Figure 3:
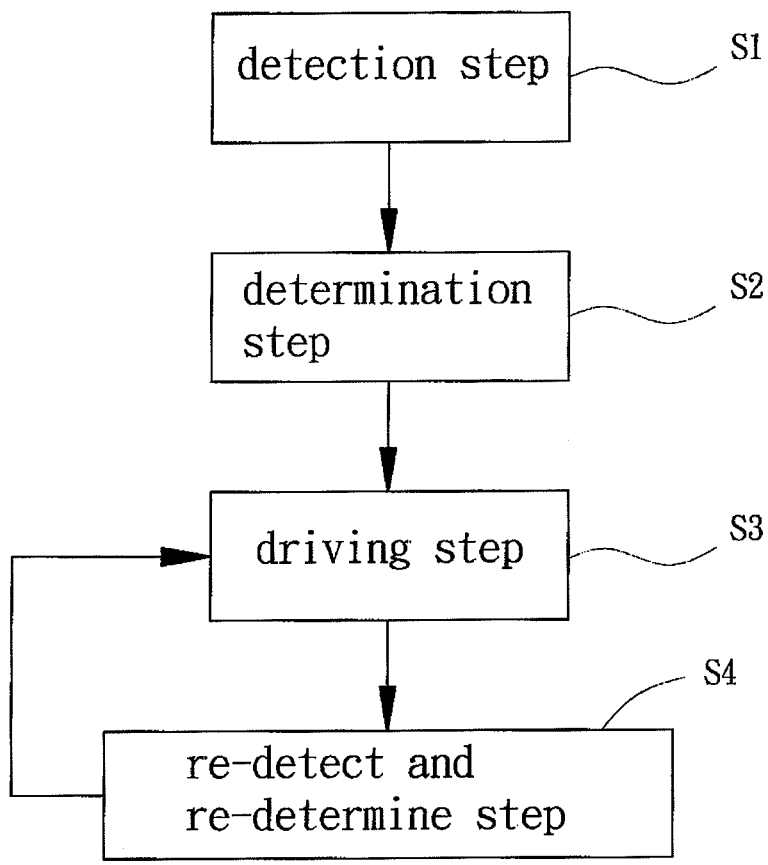
FIG. 3 shows a flowchart of a rotation direction control method according to the preferred embodiment of the invention.

Referring to FIG. 3, a flowchart of a rotation direction control method is shown according to the preferred embodiment of the invention. The rotation direction control method includes a detection step S1, a determination step S2 and a driving step S3. Referring to both FIGS. 2 and 3 again, during the detection step S1, the rotation direction control unit 2 receives the temperature control signal from the temperature detection unit 3 after the predetermined dust-expelling time period begins. Meanwhile, the temperature detection unit 3 may monitor the detected temperature in real time and generate the temperature control signal for the rotation direction control unit 2. Alternatively, the rotation direction control unit 2 may inform the temperature detection unit 3 to detect temperature and to generate the temperature control signal until after the predetermined dust-expelling time period begins. During the determination step S2, the rotation direction control unit 2 determines whether the detected temperature is higher than a predetermined value based on the temperature control signal. During the driving step S3, if the determination of the determination step S2 is positive, the rotation direction control unit 2 keeps outputting the cooling signal to drive the motor 8 for cooling purposes. Otherwise, the rotation direction control unit 2 outputs the dust-expelling signal to drive the motor 8 for dust exhaustion. In this mechanism, it is possible to expel the heat of the electronic products equipped with the motor 8 when it is needed, thus avoiding damages to the electronic products resulting from extreme heat.

Moreover; the rotation direction control unit 2 may have an extra cooling time period shorter than the predetermined dust-expelling time period. As such, the rotation direction control unit 2 is allowed to keep outputting the cooling signal for an extra period (namely, the extra cooling time period) when the determination of the determination step S2 is positive, and performs a re-detect and re-determine step S4 following the extra cooling time period. Specifically, if the determination of the determination step S2 is positive at a moment where the predetermined cooling time period expires (meaning that it is still required to perform the cooling operation even though the predetermined cooling time period is over), the rotation direction control unit 2 may be able to keep outputting the cooling signal for the extra cooling time period within the following predetermined dust-expelling time period. By the time the extra cooling, time period is over, the rotation direction control unit 2 may receive an instantly-detected temperature control signal from the temperature detection unit 3, and the re-detect and re-determine step S4 is performed to determine whether the latest detected temperature is still higher than the predetermined value or not based on the instantly-detected temperature control signal. Then, the driving step S3 is subsequently performed according to the determined result. If the determination of the re-detect and re-determine step S4 is positive, the rotation direction control unit 2 enters the predetermined cooling time period immediately. On the contrary, if the determination of the re-detect and re-determine step S4 is negative, the rotation direction control unit 2 outputs the dust-expelling signal to drive the motor 8 for dust exhaustion. In this way, even though the electronic products still remain a high temperature after the cooling process of the extra cooling time period, the motor 8 may still keep expelling the heat of the electronic products for further cooling effect.

Figure 4:
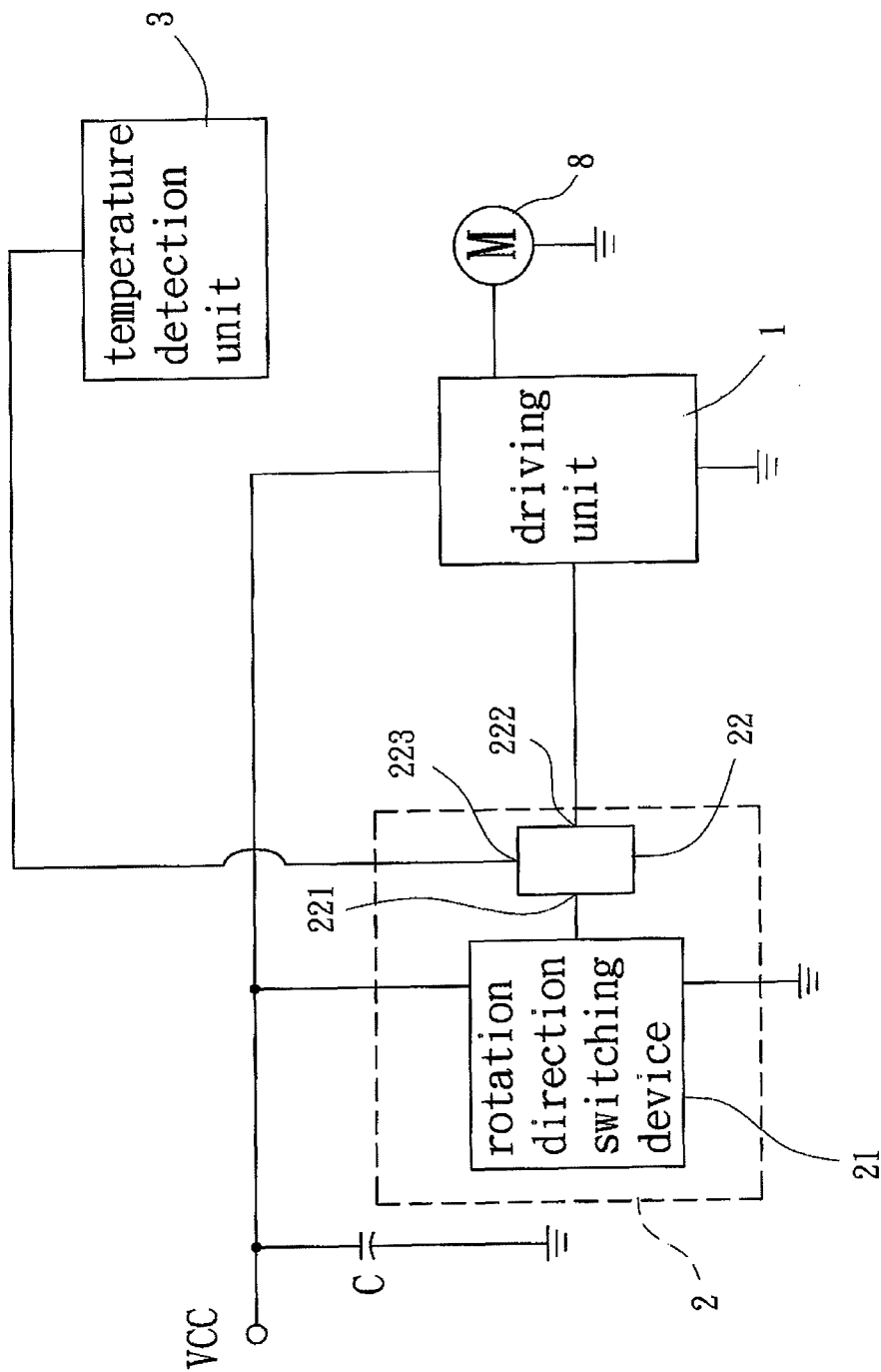
FIG. 4 shows a circuit diagram of the rotation direction control circuit when a rotation direction control unit thereof is implemented as an electronic circuit according to the preferred embodiment of the invention.
Figure 5A:
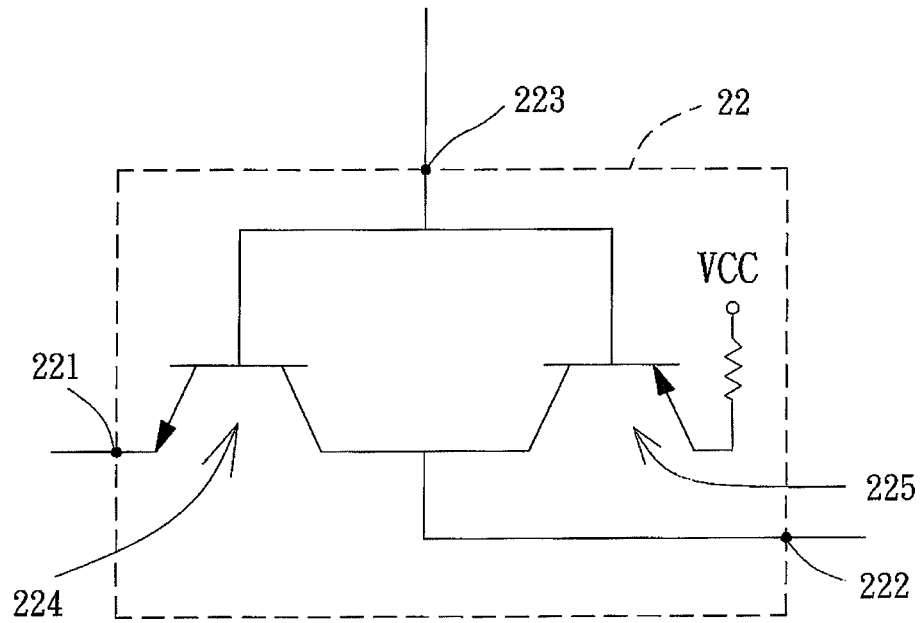
FIG. 5a shows a circuit diagram of an implementation of an adjusting switch of the rotation direction control circuit according to the preferred embodiment of the invention.
Figure 5B:
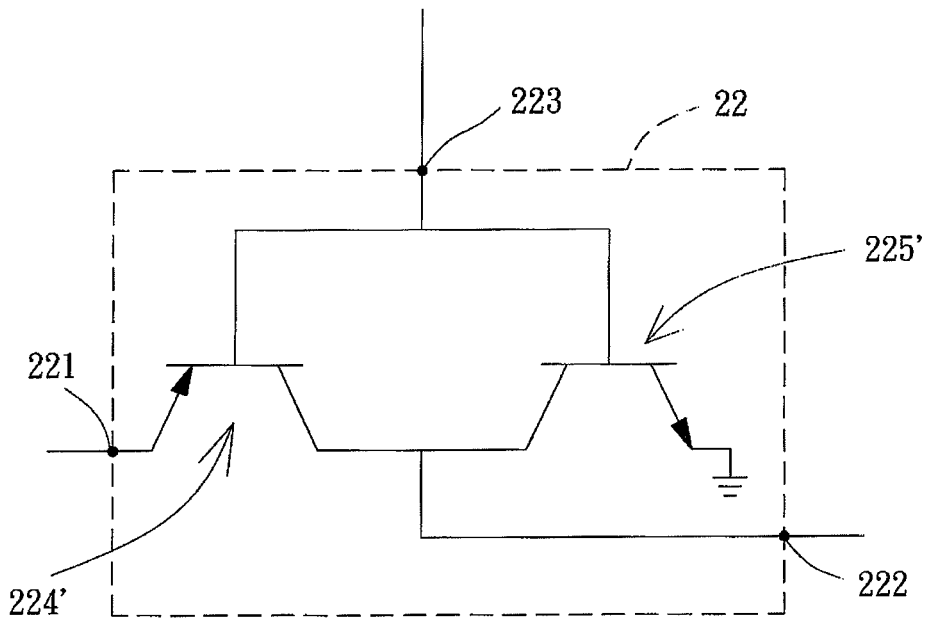
FIG. 5b shows a circuit diagram of an implementation of another adjusting switch of the rotation direction control circuit according to the preferred embodiment of the invention.

Furthermore, referring to FIG. 4, a circuit diagram of the rotation direction control circuit for which the rotation direction control unit 2 is implemented as an electronic circuit is shown according to the preferred embodiment of the invention. Under the implementation, the rotation direction control unit 2 includes a rotation direction switching device 21 and an adjusting switch 22. The rotation direction switching device 21 is electrically connected to the driving unit 1 via the adjusting switch 22 which, in turn, is electrically connected to the temperature detection unit 3. The rotation direction switching device 21 generates a high-level or low-level signal for the adjusting switch 22. The adjusting switch 22 further receives the temperature control signal from the temperature detection unit 3 so as to determine which of the cooling signal and the dust-expelling signal should be outputted to the driving unit 1. The adjusting switch 22 includes an input end 221, an output end 222 and a control end 223. The input end 221 is connected to the rotation direction switching device 21, the output end 222 is connected to the driving unit 1, and the control end 223 is connected to the temperature detection unit 3. Specifically, the adjusting switch 22 may be implemented as a circuit structure shown in FIG. 5a. In FIG. 5a, the adjusting switch 22 consists of a first electronic switch 224 and a second electronic switch 225 connected together in series. The first electronic switch 224 and second electronic switch 225 are connected in series between the input end 221 and a power supply VCC, with the output end 222 being where the first electronic switch 224 and second electronic switch 225 are connected together. In addition, controlled ends of the first electronic switch 224 and second electronic switch 225 (such as base of BJT or gate of MOSFET) are connected together to form the control end 223. Alternatively, as shown in FIG. 5b, the adjusting switch 22 consists of a first electronic switch 224' and a second electronic switch 225' connected together in series between the input end 221 and the ground.

In this arrangement, taking the implementation in FIG. 5a as an example and referring to FIG. 3, it is assumed that the high-level signal serves as the cooling signal and the low-level signal serves as the dust-expelling signal. In this case, it may be arranged that the temperature detection unit 3 outputs the high-level signal as the temperature control signal when the detected temperature thereof is lower than the predetermined value, and outputs the low-level signal as the temperature control signal when the detected temperature thereof is higher than the predetermined value. At this moment, during the determination step S2, the first electronic switch 224 is ON and the second electronic switch 225 is OFF when the detected temperature is lower than the predetermined value. Thus, the driving unit 1 may drive the motor 8 for cooling purposes during the predetermined cooling time period, and drive the motor 8 for dust exhaustion during the predetermined dust-expelling time period. On the contrary, during the determination step S2, the first electronic switch 224 is OFF and second electronic switch 225 is ON when the detected temperature is higher than the predetermined value. In this case, the output end 222 will keep outputting the high-level signal (cooling signal) to maintain cooling operation of the motor 8. Alternatively, as shown in FIG. 5b, taking the implementation in FIG. 5b as an example and referring to FIG. 3, it is assumed that the low-level signal serves as the cooling signal and the high-level signal serves as the dust-expelling signal. In this case, it may be arranged that the temperature detection unit 3 outputs the high-level signal as the temperature control signal when the detected temperature thereof is higher than the predetermined value, and outputs the low-level signal as the temperature control signal when the detected temperature thereof is lower than the predetermined value. At this moment, during the determination step S2, the first electronic switch 224' is ON and the second electronic switch 225' is OFF when the detected temperature is lower than the predetermined value. Thus, the driving unit 1 may drive the motor 8 for cooling purposes during the predetermined cooling time period and drive the motor 8 for dust exhaustion during the predetermined dust-expelling time period. On the contrary, during the determination step S2, the first electronic switch 224 is OFF and the second electronic switch 225 is ON when the detected temperature is higher than the predetermined value. In this case, the output end 222 will keep outputting the low-level signal (cooling signal) to maintain cooling operation of the motor 8.

Figure 6:
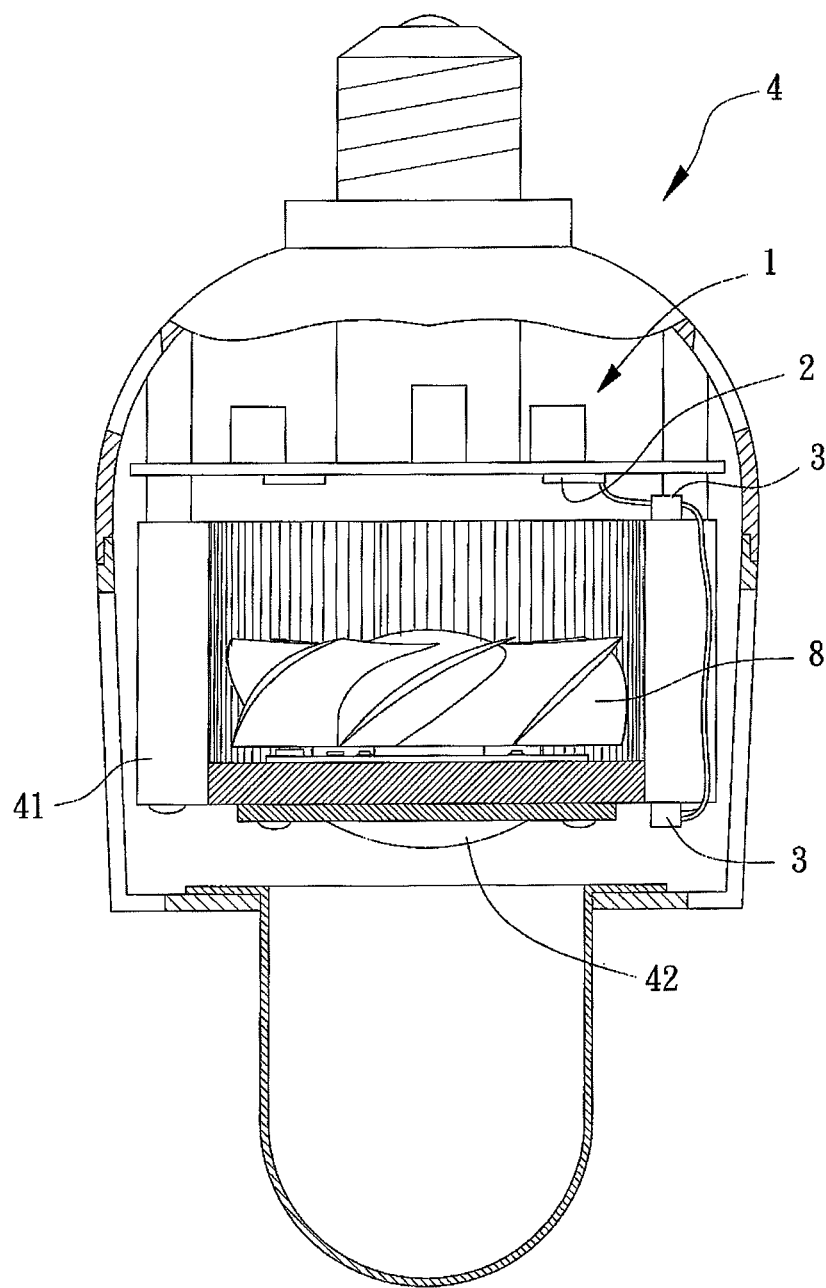
FIG. 6 shows a side cross-sectional view of a lamp having a cooling module and the rotation direction control circuit.

Referring to FIG. 6, a side cross-sectional view of a lamp 4 having a cooling module and the rotation direction control circuit is shown, with the cooling module of the lamp 4 including the motor 8. In such an application, the temperature detection unit 3 may be disposed on cooling fins 41 of the cooling module, or even disposed adjacent to a lightening portion 42 of the lamp 4 for more accurate temperature detection of the heat-radiating source. Note the rotation direction control method and the rotation direction control circuit of the invention not only can be applied to the lamp 4 as described above, but also to other electronic devices that require a cooling function during operation thereof, such as desktops, notebook computers/PCs or other 3C products. Furthermore, when the rotation direction control method and the rotation direction control circuit of the invention are applied to electronic products with a programming function, a device which performs and directs the programming function in the electronic products may serve as the rotation direction control unit 2 to drive the motor 8. For example, program codes executed by the rotation direction control unit 2 may be directly written into BIOS of a computer for driving a cooling fan installed in the computer.

In conclusion, the rotation direction control method and the rotation direction control circuit of the invention detect the temperature via the temperature detection unit 3, and generate the temperature control signal based on the detected temperature. Therefore, the rotation direction control unit 2 is not only able to drive the motor 8 for cooling purposes within the predetermined cooling time period and drive the motor 8 for dust exhaustion during the predetermined dust-expelling time period, but also to maintain the cooling operation when the detected temperature is too high. Thus, damages to the electronic products resulting from high operation temperature may be avoided.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A rotation direction control method of a cooling fan executed in a predetermined cooling time period and a predetermined dust-expelling time period immediately following the predetermined cooling time period, wherein the cooling fan comprises a motor that is driven by a cooling signal to perform a cooling operation in the predetermined cooling time period, comprising:
 a detection step receiving a temperature control signal from a temperature detection unit by a rotation direction control unit when the predetermined dust-expelling time period begins;
 a determination step determining whether a detected temperature is higher than a predetermined value based on the temperature control signal by the rotation direction control unit; and
 a driving step controlling the rotation direction control unit to keep outputting the cooling signal to drive the motor of the cooling fan for the cooling operation when the determination of the determination step is positive, wherein the driving step controls the rotation direction control unit to output a dust-expelling signal to drive the motor of the cooling fan for a dust exhaustion operation when the determination of the determination step is negative;

wherein an adjusting switch has an input end, an output end, a control end, a first electronic switch and a second electronic switch, the input end is electrically coupled to a rotation direction switching device, the output end is electrically coupled to a driving unit, the control end is electrically coupled to the temperature detection unit, the first and second electronic switches are electrically coupled in series between the input end and a power supply, the output end is where the first and second electronic switches are electrically coupled together, and controlled ends of the first and second electronic switches jointly form the control end.

2. The rotation direction control method of the cooling fan as claimed in claim 1, wherein the cooling signal outputted by the rotation direction control unit is maintained for an extra cooling time period when the determination of the determination step is positive.

3. The rotation direction control method of the cooling fan as claimed in claim 2, further comprising a re-detect and re-determine step which, when the extra cooling time period expires, receives an instantly-detected temperature control signal from the temperature detection unit by the rotation direction control unit, and determines whether a latest detected temperature is higher than the predetermined value based on the instantly-detected temperature control signal, wherein the extra cooling time period is shorter than the predetermined dust-expelling time period.

4. A rotation direction control circuit of a cooling fan comprising:
   a driving unit electrically coupled to a motor of the cooling fan;
   a temperature detection unit generating a temperature control signal according to a detected temperature thereof; and
   a rotation direction control unit electrically coupled to the driving unit and the temperature detection unit, receiving the temperature control signal of the temperature detection unit, and outputting a cooling signal to the driving unit for a cooling operation or outputting a dust-expelling signal to the driving unit for a dust exhaustion operation, wherein the rotation direction control unit outputs the cooling signal when the detected temperature is higher than a predetermined value,
   wherein the rotation direction control unit includes a rotation direction switching device and an adjusting switch, the rotation direction switching device is electrically coupled to the driving unit via the adjusting switch, and the adjusting switch is electrically coupled to the temperature detection unit,
   wherein the adjusting switch has an input end, an output end, a control end, a first electronic switch and a second electronic switch, the input end is electrically coupled to the rotation direction switching device, the output end is electrically coupled to the driving unit, the control end is electrically coupled to the temperature detection unit, the first and second electronic switches are electrically coupled in series between the input end and a power supply, the output end is where the first and second electronic switches are electrically coupled together, and controlled ends of the first and second electronic switches jointly form the control end.

5. The rotation direction control circuit of the cooling fan as claimed in claim 4, wherein the rotation direction control unit is a micro-controller.

6. A rotation direction control circuit of a cooling fan comprising:
   a driving unit electrically coupled to a motor of the cooling fan;
   a temperature detection unit generating a temperature control signal according to a detected temperature thereof; and
   a rotation direction control unit electrically coupled to the driving unit and the temperature detection unit, receiving the temperature control signal of the temperature detection unit, and outputting a cooling signal to the driving unit for a cooling operation or outputting a dust-expelling signal to the driving unit for a dust exhaustion operation, wherein the rotation direction control unit outputs the cooling signal when the detected temperature is higher than a predetermined value,
   wherein the rotation direction control unit includes a rotation direction switching device and an adjusting switch, the rotation direction switching device is electrically coupled to the driving unit via the adjusting switch, and the adjusting switch is electrically coupled to the temperature detection unit,
   wherein the adjusting switch has an input end, an output end, a control end, a first electronic switch and a second electronic switch, the input end is electrically coupled to the rotation direction switching device, the output end is electrically coupled to the driving unit, the control end is electrically coupled to the temperature detection unit, the first and second electronic switches are electrically coupled in series between the input end and the ground, the output end is where the first and second electronic switches are electrically coupled together, and controlled ends of the first and second electronic switches jointly form the control end.

7. The rotation direction control circuit of the cooling fan as claimed in claim 6, wherein the rotation direction control unit is a micro-controller.

8. A rotation direction control method of a cooling fan executed in a predetermined cooling time period and predetermined dust-expelling time period immediately following the predetermined cooling time period, wherein the cooling fan comprises a motor that is driven by a cooling signal to perform a cooling operation in the predetermined cooling time period, comprising:
   a detection step receiving a temperature control signal from a temperature detection unit by a rotation direction control unit when the predetermined dust-expelling time period begins;
   a determination step determining whether a detected temperature is higher than a predetermined value based on the temperature control signal by the rotation direction control unit; and
   a driving step controlling the rotation direction control unit to keep outputting the cooling signal to drive the motor of the cooling fan for the cooling operation when the determination of the determination step is positive, wherein the driving step controls the rotation direction control unit to output a dust-expelling signal to drive the motor of the cooling fan for a dust exhaustion operation when the determination of the determination step is negative;
   wherein an adjusting switch has an input end, an output end, a control end, a first electronic switch and a second electronic switch, the input end is electrically coupled to a rotation direction switching device, the output end is electrically coupled to a driving unit, the control end is electrically coupled to the temperature detection unit, the first and second electronic switches are electrically coupled in series between the input end and a ground, the output end is where the first and second electronic switches are electrically coupled together, and controlled ends of the first and second electronic switches jointly form the control end.

9. The rotation direction control method of the cooling fan as claimed in claim 8, wherein the cooling signal outputted by the rotation direction control unit is maintained for an extra cooling time period when the determination of the determination step is positive.

10. The rotation direction control method of the cooling fan as claimed in claim 9, further comprising a re-detect and re-determine step which, when the extra cooling time period expires, receives an instantly-detected temperature control signal from the temperature detection unit by the rotation direction control unit, and determines whether a latest detected temperature is higher than the predetermined value based on the instantly-detected temperature control signal, wherein the extra cooling time period is shorter than the predetermined dust-expelling time period.

\* \* \* \* \*